United States Patent [19]

Notestein

[11] Patent Number: 5,232,673
[45] Date of Patent: Aug. 3, 1993

[54] SHIELDED FLUID STREAM INJECTOR FOR PARTICLE BED REACTOR

[75] Inventor: John E. Notestein, Morgantown, W. Va.

[73] Assignee: The United States of America as represented by the United States Department of Energy, Washington, D.C.

[21] Appl. No.: 750,680

[22] Filed: Aug. 27, 1991

[51] Int. Cl.⁵ .............................................. B01J 8/12
[52] U.S. Cl. ................................ 422/216; 15/104.05; 15/104.16; 422/711; 422/239; 422/310
[58] Field of Search ............... 422/179, 216, 172, 211, 422/310, 239, 111; 15/104.02, 104.33, 104.05, 104.16, 104.15, 104.31, 104.1 R

[56] References Cited

U.S. PATENT DOCUMENTS

| | | | |
|---|---|---|---|
| 602,937 | 4/1898 | Egli | 15/104.16 |
| 2,241,560 | 5/1941 | Schouler | 15/104.33 |
| 2,454,884 | 11/1948 | Peaden | 15/104.31 X |
| 2,469,329 | 5/1949 | Crowley, Jr. | 422/216 X |
| 2,556,198 | 6/1951 | Lassiat | 422/216 |
| 2,593,495 | 4/1952 | Shimp | 422/216 X |
| 2,651,067 | 9/1953 | Collison | 15/104.33 |
| 2,678,874 | 5/1954 | Parker et al. | 422/216 |
| 2,689,211 | 9/1954 | Findlay | 422/216 X |
| 2,752,231 | 6/1956 | Bearer | 422/111 |
| 2,797,757 | 7/1957 | Webre | 15/104.16 X |
| 4,234,314 | 11/1980 | Jones | 422/111 |
| 4,256,700 | 3/1981 | Smith et al. | 422/172 X |

Primary Examiner—Robert J. Warden
Assistant Examiner—Amalia Santiago
Attorney, Agent, or Firm—David E. Breeden; Stephen D. Hamel; William R. Moser

[57] ABSTRACT

A shielded fluid-stream injector assembly is provided for particle bed reactors. The assembly includes a perforated pipe injector disposed across the particle bed region of the reactor and an inverted V-shaped shield placed over the pipe, overlapping it to prevent descending particles from coming into direct contact with the pipe. The pipe and shield are fixedly secured at one end to the reactor wall and slidably secured at the other end to compensate for thermal expansion. An axially extending housing aligned with the pipe and outside the reactor and an in-line reamer are provided for removing deposits from the inside of the pipe. The assembly enables fluid streams to be injected and distributed uniformly into the particle bed with minimized clogging of injector ports. The same design may also be used for extraction of fluid streams from particle bed reactors.

12 Claims, 2 Drawing Sheets ns673

SHIELDED FLUID STREAM INJECTOR FOR PARTICLE BED REACTOR

ORIGIN OF THE INVENTION

The U.S. Government has rights to this invention pursuant to the employer-employee relationship of the United States Department of Energy and the inventor.

FIELD OF THE INVENTION

This invention relates to apparatus for injecting fluid process streams into particle bed reactors.

BACKGROUND OF THE INVENTION

A need exists for means to inject a nominally gaseous stream into a bed of slowly moving solid particles and to provide a reasonably uniform distribution of the gases across the bed diameter so that essentially all of the bed material in the horizontal plane of the injector can react with the gases. In general, this need arises for a moving bed chemical reactor in which the solids are in gravity flow. A specific example is in the field of coal gasification wherein small lump coal particles are fed onto a slowly downward moving particle bed into which it is desired to inject a mixture of hot reducing gases, steam, and/or a small amount of entrained solid particles. Such processes are normally carried out at severe conditions of temperature and pressure, for example, up to 2,000° F. and 600 psi so that a rugged apparatus is required for this purpose. In addition to meeting these requirements, the injector must not significantly restrict the gravitational downward flow of solids in the reactor and should provide a capability for injecting gases, vapors, or liquids carrying entrained solids or pastes into the reactor bed. A capability for withdrawing of a nominally gas stream from within the particle bed is also a desired alternative.

Prior approaches such as injecting a gas stream from an unshielded perforated pipe or from gas ports around the periphery of the reactor have shown a tendency toward plugging of the ports of the pipe and/or a failure to provide the desired uniformity of gas distribution within the bed.

SUMMARY OF THE INVENTION

The present invention is directed to apparatus for injecting a fluid stream into a gravity-flowing particle bed reactor, the injector comprising a perforated pipe adapted to be placed across the particle bed and a shield placed over the pipe along its length in spaced-apart relation thereto so that downwardly moving particles do not come into direct contact with the injection ports of the pipe. Fluid streams injected by this apparatus readily flow around the edges of the shield and come into contact with the particles in the bed. The shield may have an inverted V-shape or rounded V-shape cross section, with sides of the shield extending outward past the pipe so as to provide a substantial overlap. The injector pipe and shield may be rigidly and sealably mounted on a reactor wall at an input aperture therein and slidably mounted on the reactor wall across from the input so as to accommodate thermal expansion under severe reaction conditions. An axial extension of the pipe outside the reactor may also be provided for housing an in-line reamer attachment to enable periodic removal of deposits that may accumulate inside the pipe. For large reactors, plural injectors may be placed in either a parallel or a radial array.

Shielded injectors embodying the invention provide for introduction of a fluid stream into a particle bed in a manner such as to achieve highly uniform distribution across the plane of the injector. The injector may also be used for withdrawal of a gas stream from a particle bed reactor.

It is, therefore, an object of this invention to provide an injector apparatus for introducing, or alternately, withdrawing a fluid stream into or out of a particle bed reactor.

Another object is to provide a shielded injector that enables uniform distribution of reactant gases in a particle bed.

Yet another object is to provide an injector assembly that eliminates contact of injector ports with downwardly moving particles in a particle bed.

Other objects of the invention will be apparent from the following detailed description and appended claims.

DEFINITIONS

"Particle bed reactor" as used herein is intended to refer to reactors in which particles flow downward by gravity in a packed bed or are stationary. This type of reactor is normally classified as a "moving bed" or "fixed bed" reactor. The invention may also be applied to beds that are operating in a state approaching incipient fluidization.

"Fluid stream" is intended to refer to a gas or liquid stream which may contain a small amount of entrained solid particles, for example, 1 to 10 percent by weight of the fluid. In particular, gas streams comprising a mixture of hot reducing gases and steam and carrying such an amount of entrained solid particles are intended to be included within this term

DESCRIPTION OF THE PREFERRED EMBODIMENT

Figure 1:
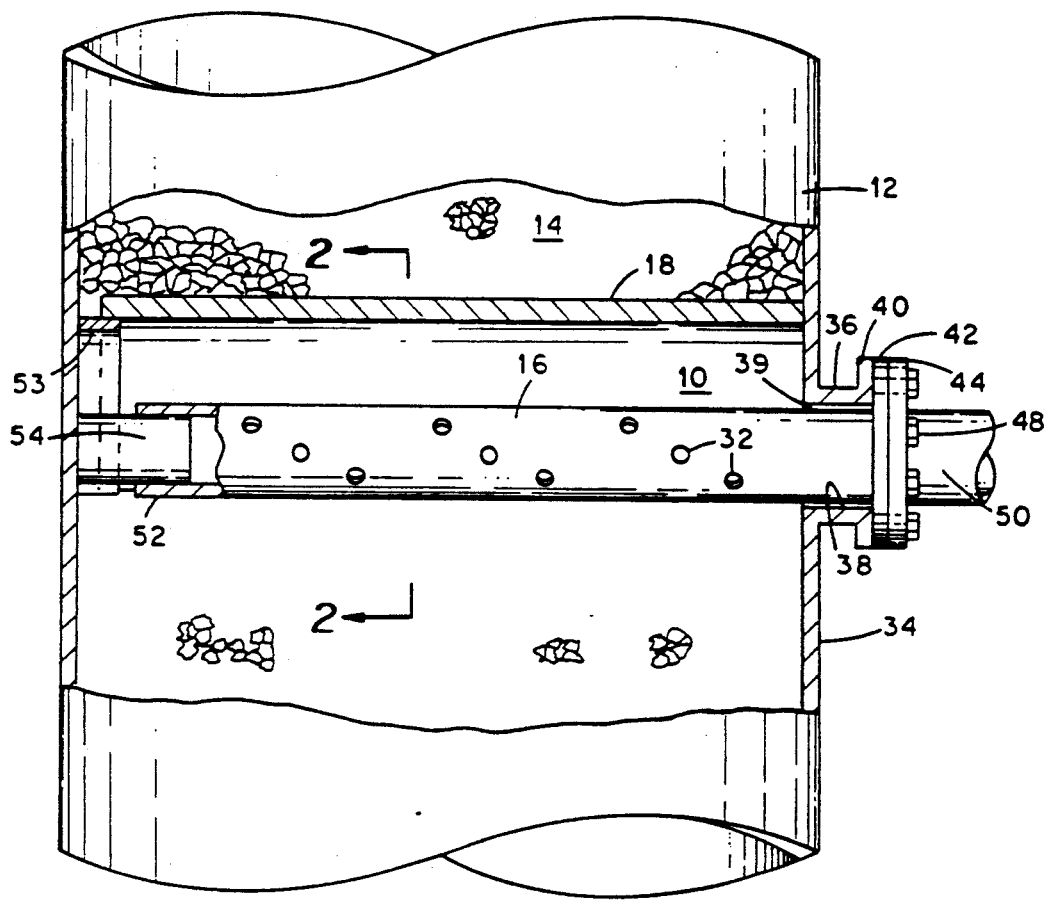
FIG. 1 is a view, partly in section and partly broken away, showing a shielded fluid-stream injector mounted in a particle bed reactor.
Figure 2:
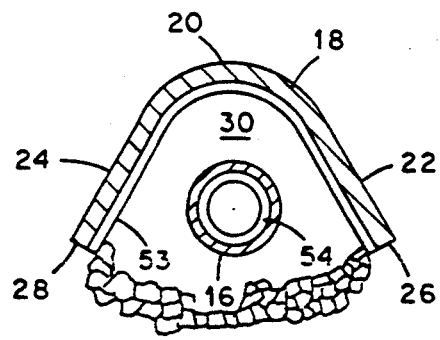
FIG. 2 is a sectional view taken along line 2—2 of FIG. 1.

Referring to FIGS. 1 and 2 of the drawings, there is shown a shielded fluid stream injector assembly 10 installed in a vertically disposed cylindrical reactor 12. The injector is installed at a mid point of the reactor and located within a bed of solid particles 14 flowing downward by gravity. The injector assembly has a perforated pipe 16 disposed across the center of the bed and a shield 18 placed over the pipe and along its length so as to prevent descending particles from coming into contact with the pipe. The shield preferably has an inverted, generally V-shaped cross section rounded at its top 20 although the top may also have a sharply defined angle.

Pipe 16 has a plurality of perforations 32 preferably disposed in diagonally extending rows along its length. The pipe is fixedly mounted normal to reactor wall 34 by being secured to a horizontally extending nozzle member 36 incorporating aperture 38 and having a vertically extending flange 40 to which metal flange rings 42, 44, are connected by bolts 48, forming a sealed joint to input pipe 50. A gap 39 is provided between pipe 16 and the edge of aperture 38 to thermally isolate the injector pipe from the wall and to facilitate removal of the injector pipe. Opposite end 52 of the pipe is slidably connected to the reactor wall opposite to the input side by being mounted on a stud 54 secured to the wall, providing for axial movement of the stud and pipe to compensate for thermal expansion such as may occur when the pipe is subjected to elevated temperatures. Shield 18 is fixedly secured to reactor wall 34 on the pipe inlet side by being welded thereto and may be slidably mounted to the wall on the opposite side by riding on top of an underlying support 53 secured to the wall and having a shape corresponding to the underside of the shield. This enables the shield as well as the pipe to undergo differing relative motions to compensate for thermal expansion without inducing internal stresses. In some cases, a cantilevered pipe with or without an open end may be employed.

The sides 22, 24 of the shield are disposed at an angle such that solids may come into contact with the shield and flow downward smoothly without coming into contact with the pipe. Sides of the shield below the rounded top should be located at an angle with respect to horizontal of no less than the angle of repose of the solids at the process conditions in the region of the shield. The shape of the top of the shield is not critical and may be determined by structural and manufacturing considerations; either rounded or pointed shapes may be used.

The overall width of the shield at its bottom represents a partial blockage of the general solids flow area within the reactor, and this must be allowed for in reactor design; this is particularly important for designs utilizing an array of injector units. Consequently, the lengths of sides 22 and 24 are selected such that the solids flowing around them do not contact the shield. Sides 22, 24 of the shield are to be minimized. They terminate at edges 26, 28 which are located so that the solids flowing around shield edges 26 and 28 define a cusp-shaped lower boundary of solids below the ullage region 30 between the pipe and shield.

The diameter of the injector pipe and its location relative to the shield interior surfaces controls the major physical dimensions of the shield and thus is an important design aspect. The specific size of the pipe is determined by the amount of fluid to be handled and is a relatively straightforward calculation. For typical reactors, pipes with a diameter of 3" to 8" would be representative. The pipe's location under the shield is a function of the angle of repose of the solids within the reactor bed, the physical characteristics of fluid being injected and the design specifics of the injector pipe itself (for example, perforation shapes and locations, pipe cross-sectional shape, etc.). The downward flowing solids will spill around the bottom edges of the shield to refill the reactor volume below it. The shape of the lower surface of the void as created by the shield is consequently determined by the solid's angle of repose. The amount of ullage volume necessary around the injector pipe is determined by the injected fluid's ability to flow adequately in this void, 30, and becomes complicated if the fluid contains solids and/or has a tendency to form deposits or agglomerates In general, "clean" gases require very much less clearance between the injection pipe exterior and the interior (lower) surface of the shield than do solid-bearing fluids, and a reasonable clearance is typically in the range of 0.1 to 1.0 times the injector pipe diameter.

The injector pipe perforations must be designed to not plug over the pipe's operational lifetime as a result of the injection fluid's characteristics and the general operating environment, and to dispense the fluid into the ullage volume at a spatial frequency and pipe exit/velocity which results in an adequately uniform, ultimate distribution of the fluid into the bed of solids. Specific locations of the perforations are not otherwise critical so long as the clearances as discussed above have been provided and perforation locations do not induce a tendency to plug the injector pipe interior (that is, for injection of fluids other than "clean" gases, the pipe should have at least some of its perforations located on the bottom of the pipe to also serve as pipe "drains"). The injector pipe cross-sectional shape is also not critical. Some minimization of shield width, and consequently reactor cross-sectional blockage, can be obtained by shaping the injector pipe's cross section so as to optimize the flow channel under the shield, but this is expected to be a significant manufacturing complication for a small performance gain. The more general case of using a simple cylindrical pipe with axially distributed through-drilled holes to provide multiple side wall perforations and having one sliding end support is preferred. Perforations having a diameter of 0.3" to 1" may be used.

Figure 3:
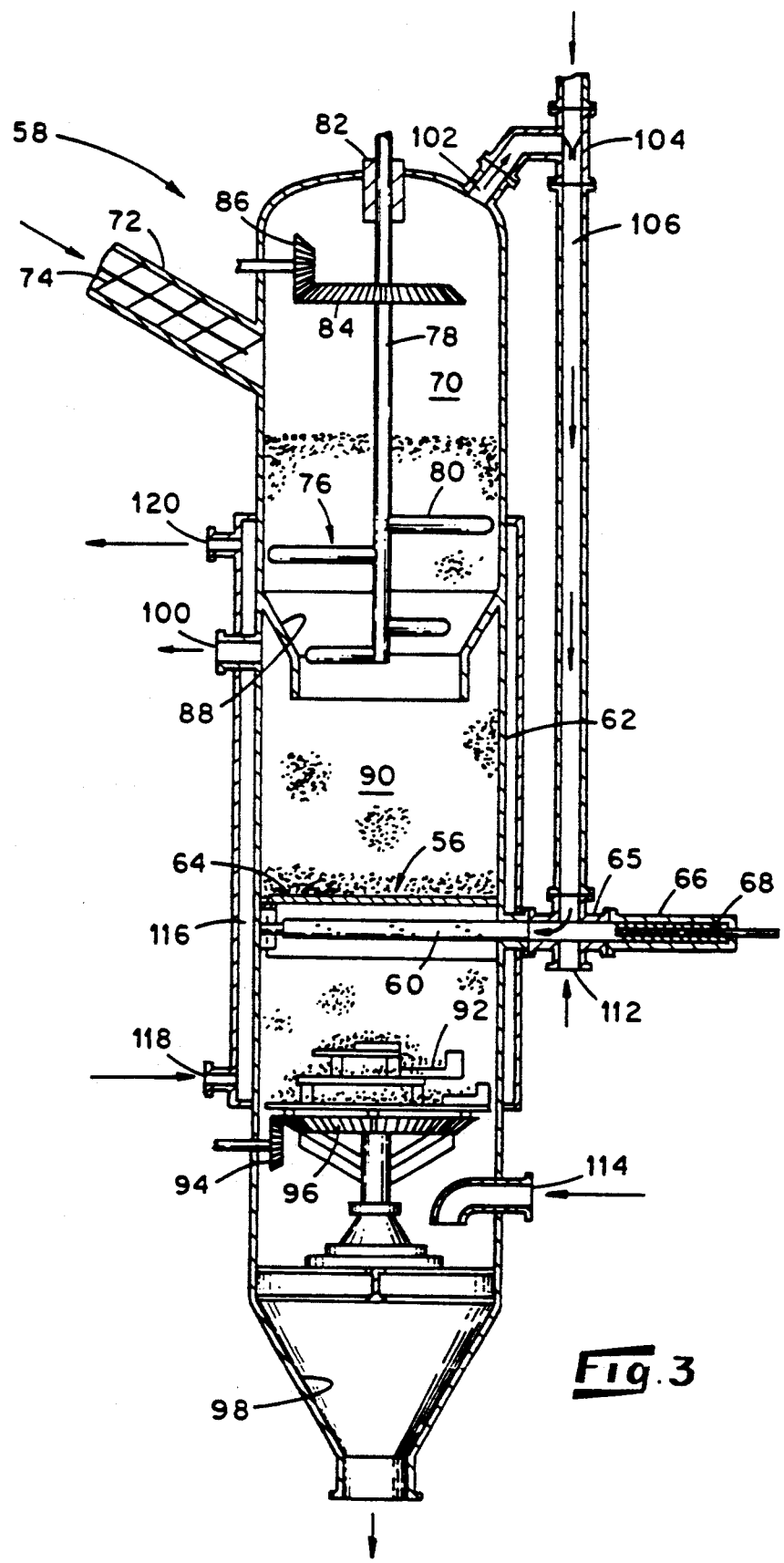
FIG. 3 is a view partially in section and partially broken away showing a recycling fixed bed gasifier reactor including a shielded fluid-stream injector embodying the invention.

FIG. 3 shows an embodiment wherein a shielded injector assembly 56 is incorporated in a recycling, fixed-bed, gasification reactor 58. The injector assembly includes a perforated injector pipe 60 disposed across the bed region of reactor 58 and fixedly secured to a wall 62 thereof. An inverted V-shaped shield 64 is located spaced apart and above the connector pipe with both the pipe and shield being slidably supported on the opposite wall, secured to the wall on its opposite side and as described above. This embodiment has an additional feature in that an axial extension 66 of the injector pipe housing is provided outside the reactor wall, and a reamer 68 is placed in alignment with the pipe extension. This in-line reamer may be used periodically to remove any deposits that may accumulate inside the injector pipe and thus prevent plugging.

The reactor 58 shown in FIG. 3 comprises a generally cylindrical vessel 70 having a diagonally disposed inlet pipe 72 near its top for introduction of pulverized coal by means of an auger 74. A mechanical stirring assembly 76 is provided in the upper region of the reactor including rod 78 having radially extending members 80 for agitating the coal, the rod being mounted in a journal 82 at the top of the reactor and driven by gears 84, 86. Coal flows by gravity downward through a tapered chute 88 into a fixed bed 90 in the middle of the reactor. Solid ashes or clinkers fall below the bed where they are broken apart by a crushing mechanism 92 driven by gears 94 and 96 and are fed out of a tapered chute 98 at the bottom of the reactor. The gasifier's product gas exits through outlet 100 in the reactor wall adjacent to chute 88. In this embodiment, a "top bed" gas is recycled through and exits the reactor through aperture 102 and eductor pipe 104 and recycling pipe 106 in communication with injector connector pipe 65 and pipe 60. Aperture 112 in the injector connector is available to provide means for cleanout or for possible gas additions. Steam and air are introduced through inlet 114 near the bottom of the reactor. A water jacket 116 is disposed around the reactor, with water being introduced through inlet 118 at the bottom of the reactor and steam being removed from the top outlet 120 for recycling.

While the invention is illustrated by embodiments having a single shielded injector disposed across a particle bed reactor, plurality injector pipe/shield units may also be used in a single reactor as may be required for larger or longer reactors. The units may be spaced in a vertical array or a cruciform or other pattern as required. Other modifications may also be employed in practicing the invention, which is limited only as indicated by the appended claims.

I claim:

1. Apparatus for injecting a fluid stream into or withdrawing such stream from a particle bet region of a gravity-fed particle bed reactor comprising:

a vessel defining a vertical reactor having a particle bed collection region and including means at an upper location in the vessel for introducing particles whereby the particles may move downward into and through the bed collection region by gravity;

at least one fluid injection duct secured to a wall of said reactor and disposed horizontally across and within the particle bed collection region for receiving a fluid stream, said duct being straight and having a plurality of perforations extending through a wall of the duct along the length thereof in said particle bed collection region; and an elongated shield extending parallel to said duct and having a pair of downwardly inclined sides disposed above and spaced apart from said duct so as to substantially cover the duct, said shield being fixedly secured to a wall of said reactor;

whereby said fluid stream may be dispersed uniformly into or removed from said particle bed region with minimized clogging of perforations in said duct.

2. Apparatus as defined in claim 1 wherein said duct is a pipe.

3. Apparatus as defined in claim 2 wherein said shield has an inverted, generally V-shaped cross section.

4. Apparatus as defined in claim 2 wherein said shield is rounded at its top.

5. Apparatus as defined in claim 2 wherein said pipe is straight and one end of said pipe and shield are fixedly secured to said reactor wall at a first location and are slidably mounted on stud means secured to said wall at a second location opposite from the first location, whereby longitudinal thermal expansion of the pipe and shield may be accommodated.

6. Apparatus as defined in claim 5 including a housing extending axially with respect to said pipe outside of said reactor wall and providing in-line access to the interior of said pipe and a reamer disposed in said housing for removing solid deposits from the interior of said pipe.

7. Apparatus as defined in claim 2 wherein said pipe has a plurality of circular perforations 0.3" to 1" in diameter.

8. Apparatus as defined in claim 5 wherein said pipe is secured to a nozzle member by flange means defining a gap between said pipe and said reactor wall.

9. Apparatus as defined in claim 1 wherein said vessel is generally cylindrical in shape.

10. Apparatus as defined in claim 2 wherein said perforations in said pipe are arranged in a plurality of diagonally extending rows.

11. Apparatus as defined in claim 7 wherein said shield is located at a vertical position such as to provide a clearance between the underside of the shield and the exterior of the pipe in the range of 0.1 to 1.0 times the injector pipe diameter.

12. Apparatus as defined in claim 9 wherein said vessel has a vertical axis, and said pipe extends radially across said axis.

* * * * *